US008274190B2

(12) United States Patent
Alexander et al.

(10) Patent No.: US 8,274,190 B2
(45) Date of Patent: Sep. 25, 2012

(54) ELECTRIC MACHINE ROTOR BAR AND METHOD OF MAKING SAME

(75) Inventors: James P. Alexander, Ballston Lake, NY (US); Robert Dean King, Schenectady, NY (US); Ayman Mohamed Fawzi El-Refaie, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/789,580

(22) Filed: May 28, 2010

(65) Prior Publication Data

US 2011/0291516 A1    Dec. 1, 2011

(51) Int. Cl.
*H02K 17/00* (2006.01)
*H02K 19/14* (2006.01)

(52) U.S. Cl. .................. 310/211; 310/210; 310/215

(58) Field of Classification Search .............. 310/211, 310/210, 215
See application file for complete search history.

(56) References Cited

U.S. PATENT DOCUMENTS

| | | | | |
|---|---|---|---|---|
| 1,524,558 A * | 1/1925 | Kincaid | | 310/211 |
| 2,048,421 A * | 7/1936 | Ballentine | | 310/211 |
| 2,350,012 A * | 5/1944 | Brady | | 310/211 |
| 2,784,333 A * | 3/1957 | Gunselman | | 310/211 |
| 2,857,539 A * | 10/1958 | Limpel | | 310/211 |
| 2,991,378 A * | 7/1961 | Barney | | 310/211 |
| 4,644,210 A * | 2/1987 | Meisner et al. | | 310/211 |
| 4,885,494 A * | 12/1989 | Higashi | | 505/166 |
| 5,182,483 A * | 1/1993 | Hibino et al. | | 310/211 |
| 5,495,133 A * | 2/1996 | Bawin et al. | | 310/211 |
| 5,793,145 A * | 8/1998 | Avakian et al. | | 310/270 |
| 5,990,595 A | 11/1999 | Crowell | | |
| 6,088,906 A * | 7/2000 | Hsu et al. | | 310/211 |
| 6,092,277 A | 7/2000 | Beltowski et al. | | |
| 6,159,305 A | 12/2000 | Kliman et al. | | |
| 6,246,141 B1 * | 6/2001 | Bailey | | 310/211 |
| 6,310,418 B1 * | 10/2001 | Clark et al. | | 310/216.065 |
| 6,882,078 B2 * | 4/2005 | Nishihama et al. | | 310/211 |
| 6,977,459 B1 | 12/2005 | Kaminski et al. | | |
| 7,129,613 B2 * | 10/2006 | Nishihama et al. | | 310/211 |
| 7,622,817 B2 | 11/2009 | El-Refaie et al. | | |
| 2004/0183390 A1 * | 9/2004 | Nishihama et al. | | 310/211 |
| 2005/0073216 A1 * | 4/2005 | Mitcham | | 310/270 |
| 2005/0156476 A1 * | 7/2005 | Nishihama et al. | | 310/211 |
| 2005/0258701 A1 * | 11/2005 | Soitu | | 310/179 |
| 2006/0150396 A1 * | 7/2006 | Sweo | | 29/596 |
| 2007/0096578 A1 | 5/2007 | Jahns et al. | | |
| 2007/0210667 A1 * | 9/2007 | Vogel | | 310/211 |
| 2008/0143207 A1 | 6/2008 | Shah et al. | | |
| 2009/0079289 A1 * | 3/2009 | Lang et al. | | 310/214 |

FOREIGN PATENT DOCUMENTS

JP           01126157 A  *  5/1989

* cited by examiner

*Primary Examiner* — Quyen Leung
*Assistant Examiner* — Alex W Mok
(74) *Attorney, Agent, or Firm* — Ziolkowski Patent Solutions Group, SC; Jean K. Testa

(57) ABSTRACT

A method, system, and apparatus including an electric machine having a plurality of rotor bars and a first coupling component configured to electrically couple the plurality of rotor bars together. Each rotor bar of the plurality of rotor bars includes a first metallic material having a first electrical resistivity and a second metallic material cast about the first material, where the second metallic material has a second electrical resistivity greater than the first electrical resistivity. The first metallic material has a first end and a second end opposite the first end and the first coupling component is coupled to the first end of the first metallic material.

16 Claims, 8 Drawing Sheets

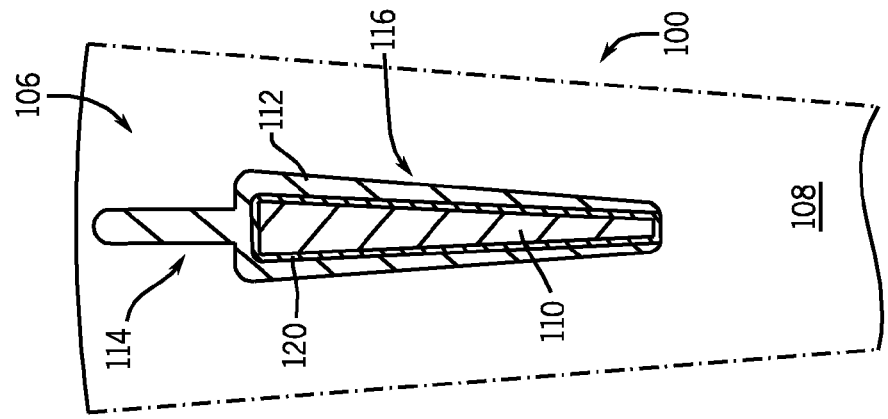
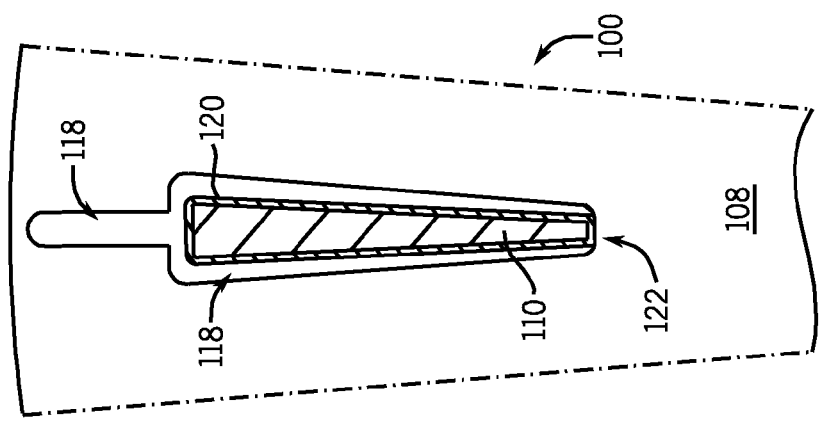
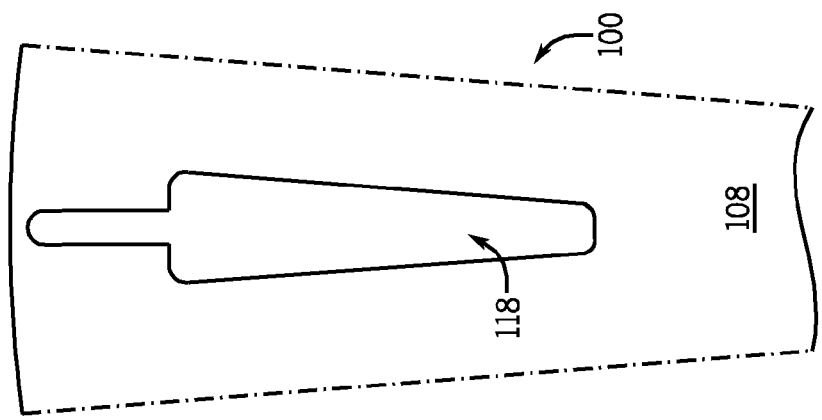

US 8,274,190 B2

ELECTRIC MACHINE ROTOR BAR AND METHOD OF MAKING SAME

BACKGROUND OF THE INVENTION

Embodiments of the invention relate generally to electric machine rotor bars and, more particularly, to a bi-metallic electric machine rotor bar.

Often, rotor bars of an electric machine such as an electric motor or generator are manufactured of one material. For example, rotor bars are often made of aluminum because of its electrical properties and the costs associated with "working" aluminum.

It has been found that the running efficiency of an electric machine can often be increased by decreasing the electrical resistance of the respective rotor bars. In other words, an electric machine having rotor bars with lower electrical resistance tends to operate more efficiently than a comparable electric machine having rotor bars with a higher electrical resistance (i.e., as rotor bar resistance decreases the electric machine running efficiency often increases).

To exploit this relationship between rotor bar resistance and running efficiency, rotor bars have been manufactured from materials having a lower electrical resistance than aluminum. For example, rotors bars made up of copper have been manufactured. However, due to the high melting point of copper, as compared to aluminum, and the difficulties associated with working with copper, copper rotor bars tend to be more costly than aluminum rotor bars.

It would therefore be desirable to provide an apparatus and method for cost effective manufacture of rotor bars that positively affect the running efficiency of an electric machine.

BRIEF DESCRIPTION OF THE INVENTION

In accordance with one aspect of the invention, an electric machine includes a plurality of rotor bars and a first coupling component configured to electrically couple the plurality of rotor bars together. Each rotor bar of the plurality of rotor bars includes a first metallic material having a first electrical resistivity and a second metallic material cast about the first material, where the second metallic material has a second electrical resistivity greater than the first electrical resistivity. The first metallic material has a first end and a second end opposite the first end and the first coupling component is coupled to the first end of the first metallic material.

In accordance with another aspect of the invention, a method of manufacturing an electric machine includes inserting a plurality of bars into a rotor bar housing and electrically coupling the plurality of bars together, where each bar of the plurality of bars includes a first metallic material having a first electrical resistivity. The method also includes casting a second metallic material about the plurality of bars inserted into the rotor bar housing, where the second metallic material has a second electrical resistivity greater than the first electrical resistivity.

In accordance with another aspect of the invention, an electric machine includes a plurality of rotor bars and a first electrical coupling ring configured to electrically couple each rotor bar of the plurality of rotor bars together. Each rotor bar of the plurality of rotor bars includes a metallic bar and a metallic covering surrounding at least a majority of the metallic bar. Each metallic bar includes a first material having a first electrical resistivity and each metallic covering has a second electrical resistivity greater than the first electrical resistivity.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIGS. 3-5 illustrate a portion of the electric machine of FIG. 2 and show an example of manufacturing a rotor bar according to an embodiment of the invention.

DETAILED DESCRIPTION

Figure 1:
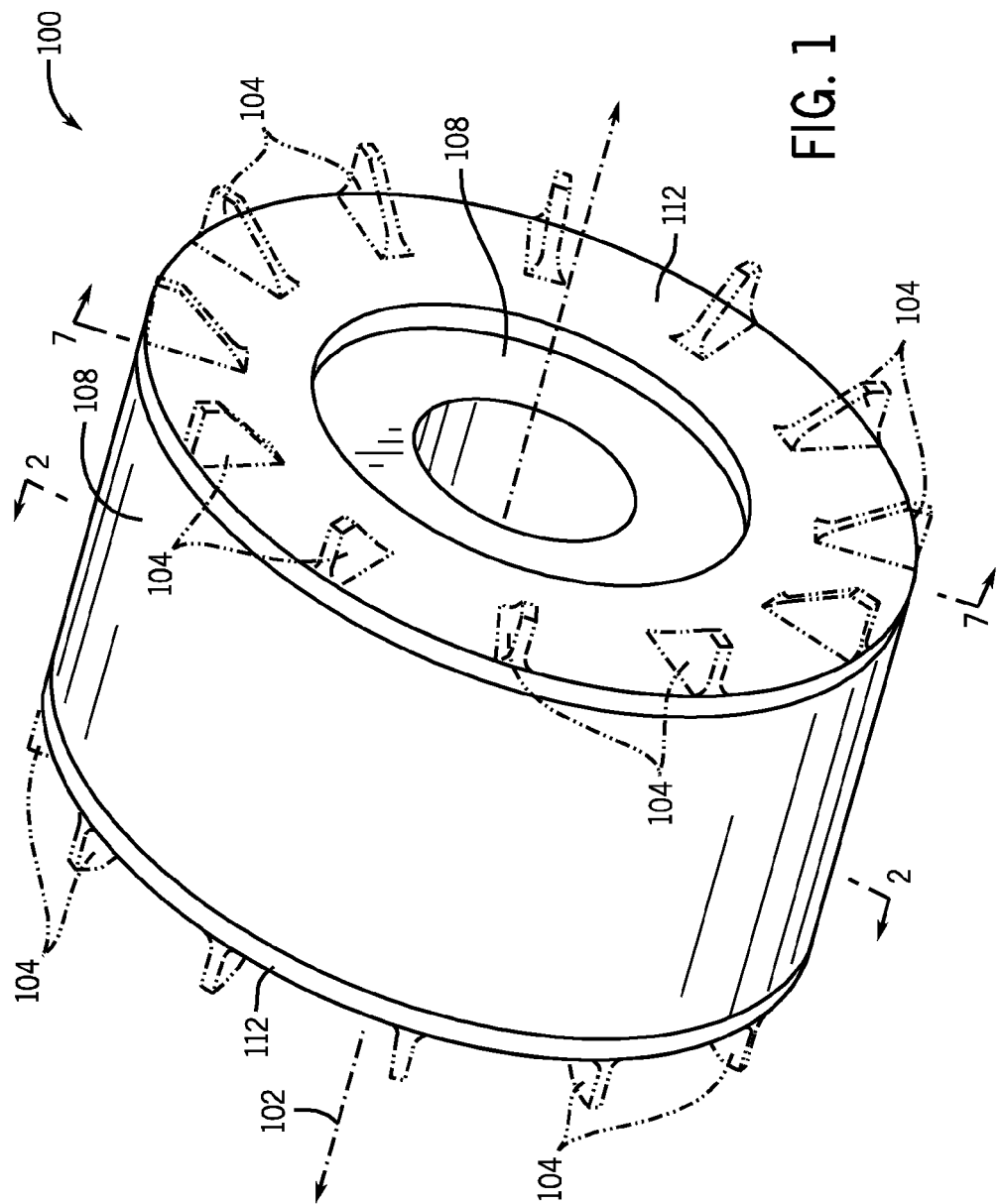
FIG. 1 is a diagram of an electric machine according to an embodiment of the invention.

Referring to FIG. 1, a diagram a portion of an electric machine 100 is shown according to an embodiment of the invention. According to the embodiment of FIG. 1, electric machine 100 has an axis of rotation 102 about which it rotates. Though not shown, but as would be appreciated by those skilled in the art, a shaft along axis of rotation 102 would, once rotated, cause electric machine 100 to rotate. It is contemplated that electric machine 100 may include a plurality of cooling fins 104 (shown in phantom). Embodiments without cooling fins 104 or with a greater or lower number of cooling fins than those shown in FIG. 1 are, however, envisioned.

It is also contemplated electric machine 100 may be of any type of electric machine that employs rotor bars. For example, such electric machines may include an induction machine such as an induction motor or generator. However, and more generally, such an electric machine may also include electric motors, generators, or the like. As will be shown below with respect to FIG. 2, electric machine 100 includes a plurality of rotor bars.

Figure 2:
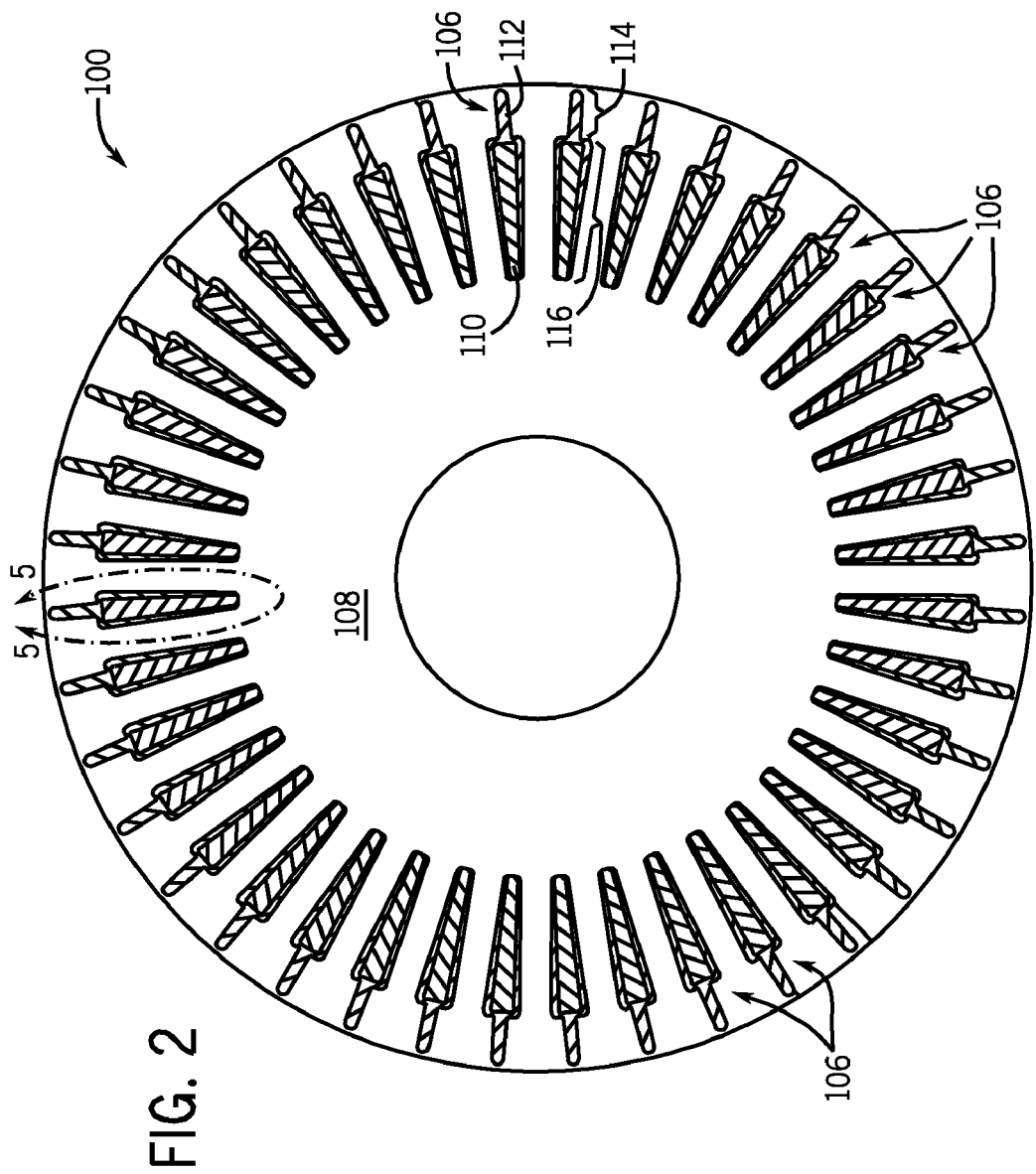
FIG. 2 is a cross-sectional view of the electric machine of FIG. 1 according to an embodiment of the invention.

Referring to FIG. 2, a cross-sectional view of electric machine 100 along line 2-2 of FIG. 1 is shown according to an embodiment of the invention. Electric machine 100 includes a plurality of rotor bars 106 extending through a core material 108 (i.e., a rotor bar housing) of electric machine 100, where each rotor bar of the plurality of rotor bars 106 includes at least a first metallic material 110 and a second metallic material 112. First metallic material 110 has a first electrical resistivity, and second metallic material 112 has a second electrical resistivity greater than the first electrical resistivity. It is noted that each rotor bar 106 includes an upper portion 114 and a lower portion 116.

According to an embodiment of the invention, first metallic material 110 includes a copper material (e.g., a copper bar) and/or a silver material while second metallic material 112 includes an aluminum material. It is envisioned, however, that first metallic material 110 may be constructed of a material other than copper or silver. For example, first metallic material 110 may be constructed of a first type of aluminum having a corresponding first electrical resistivity, and second metallic material 112 may be constructed of a second type of aluminum having a corresponding second electrical resistivity different from the first electrical resistivity. According to such an embodiment, the first type of aluminum of first metallic material 110 would have an electrical resistivity less than that of the second type of aluminum of second metallic material 112. It is noted that second metallic material 112 may be constructed of a material other than aluminum.

According to the embodiment depicted in FIG. 2, second metallic material 112 is a material cast about first metallic material 110.

The running efficiency of electric machine 100 is generally more influenced by lower portion 116 of each rotor bar 106. As electrical resistivity of lower portion 116 decreases, the running efficiency of electric machine 100 increases.

Further, starting torque of electric machine portion 100 may be influenced by upper portion 114 of each rotor bar 106. For example, as the electrical resistivity of upper portion 114 increases, so may the starting torque. Such a scenario can arise when, for example, the electrical excitation is from a fixed frequency source such as line-starting from an AC 60 Hz source.

Embodiments of the invention aid in maximizing or at least increasing the running efficiency of an electric machine (e.g., electric machine 100). Embodiments of the invention may also aid in increasing starting torque of an electric machine and/or limiting starting current of an electric machine. For example, the higher electrical resistivity of upper portion 114, due to the higher electrical resistivity of second metallic material 112, may increase starting torque and/or limit starting current. Further, since lower portion 116 includes first metallic material 110 having a lower electrical resistivity than second metallic material 112, the running efficiency of a corresponding electric machine (e.g., electric machine 100) increases.

Still referring to FIG. 2, second metallic material 112 may be chosen to maximize or increase starting torque and/or limit starting current, while first metallic material 110 can be chosen to maximize or increase running efficiency. Again, the higher electrical resistivity of upper portion 114, due to second metallic material 112, may have a positive effect on the starting torque or starting current of electric machine 100, while lower portion 116, due to the lower electrical resistivity of first metallic material 110 of lower portion 116, has a positive effect on the running efficiency of electric machine 100.

As discussed above, it is contemplated that second material 112 may be cast about first material 110. It is envisioned, however, that upper portion 114 of rotor bar 106 may be a preformed component. In such an embodiment, the preformed component may be constructed of the same material as second material 112, or it may be constructed of another material. In either case, the preformed component has an electrical resistivity higher than the electrical resistivity of first material 110.

It is also noted that embodiments of the invention may be employed to take advantage of the benefits of using high electrical resistivity rotor bars while reducing or limiting the manufacturing costs associated therewith. As would be appreciated by those skilled in the art, it is typically more expensive to manufacture an electric machine employing rotor bars made entirely of copper than to manufacture an electric machine that employs rotor bars made entirely of aluminum (i.e., a rotor bar typically having a higher electrical resistivity than a copper rotor bar). Such manufacturing cost differentials can be associated with the higher melting point of copper, which can necessitate more expensive tool and manufacturing processes. For example, it is often more expensive to cast copper than it is to cast aluminum.

According to embodiments of the invention, however, manufacturing costs of rotor bars that take advantage of the benefits of using materials with lower electrical resistivity such as copper can be minimized. For example, first metallic material 110 may be a pre-purchased copper bar either having the appropriate dimensions or may be machined to have the appropriate dimension, whereas second metallic material 112 may be cast about first metallic material 110. Accordingly, the need to cast first metallic material 110 may be avoided.

FIGS. 3-5 illustrate a portion of electric machine 100 along line 5-5 of FIG. 2 and show an example of manufacturing a rotor bar according to an embodiment of the invention.

In FIG. 3, an opening 118 in rotor core or housing 108 for insertion and casting of the rotor bar components is shown. In FIG. 4, opening 118 is shown with a first metallic material 110 inserted therein. It is contemplated that first metallic material 110 may be a bar or bar-like material. As shown, it is contemplated that first metallic material 110 may have an intervening material 120 thereon. Intervening material 120 may be a cladding (e.g., an aluminum, nickel, or other type of cladding). It is also contemplated that intervening material 120 may be an insulating material. It is noted, however, that embodiments free of an intervening material are also contemplated. Further details regarding intervening material 120 will be set forth below with respect to FIG. 5.

FIG. 5 illustrates that cast material 112 (i.e., second metallic material) fills the remaining void of opening 118 and is cast about first metallic material 110 and about intervening material 120 if present. If present, intervening material 120 may be an electrical insulator configured to at least partially electrically isolate cast material 112 from first material 110. In addition, or alternatively, intervening material 120 may be a cladding (e.g., an aluminum cladding) configured to enhance adhesion or coupling between first material 110 and cast material 112. As explained above with respect to FIG. 4, embodiments free of intervening material 120 are contemplated. Accordingly, with or without intervening material 120 shown in FIG. 5, cast material 112 about first metallic material 110 forms rotor bar 106.

It is noted that cast material 112 of rotor bar 106 need not entirely cover first material 110. For example, as depicted in the embodiment of FIG. 4, a bottom portion 122 of first material 110/intervening material 120 combination is adjacent to rotor core 108 without cast material 112 therebetween. Accordingly, casting material 112 can either fully or partially surround first material insert 110 depending on the location of first material 110 within opening 118.

As shown in FIG. 5, rotor bar 106 includes upper portion 114 and lower portion 116. First metallic material 110 has a lower electrical resistance than cast material 112. Accordingly, the effective electrical resistance of lower portion 116 is lower than the effective electrical resistance of upper portion 114. Due to the lower effective electrical resistance of lower portion 116, electric machine 100 will have a higher running efficiency than a comparable electric machine (not shown) that employs rotor bars containing only cast material 112.

Further, since cast material 112 in upper portion 114 has a higher electrical resistance than first metallic material 110, electric machine 100 may have a higher starting torque than a comparable machine (not shown) that employs rotor bars containing only the material employed for first metallic material 110 (e.g., copper). Further, the configuration of rotor bar 106 may also be beneficial in limiting starting current.

Due to the bi-metallic nature of rotor bar 106, electric machine 100 may benefit from the higher electrical resistance properties of cast material 112 while also benefiting from the lower electrical resistance properties of first metallic material 110

Figure 6:
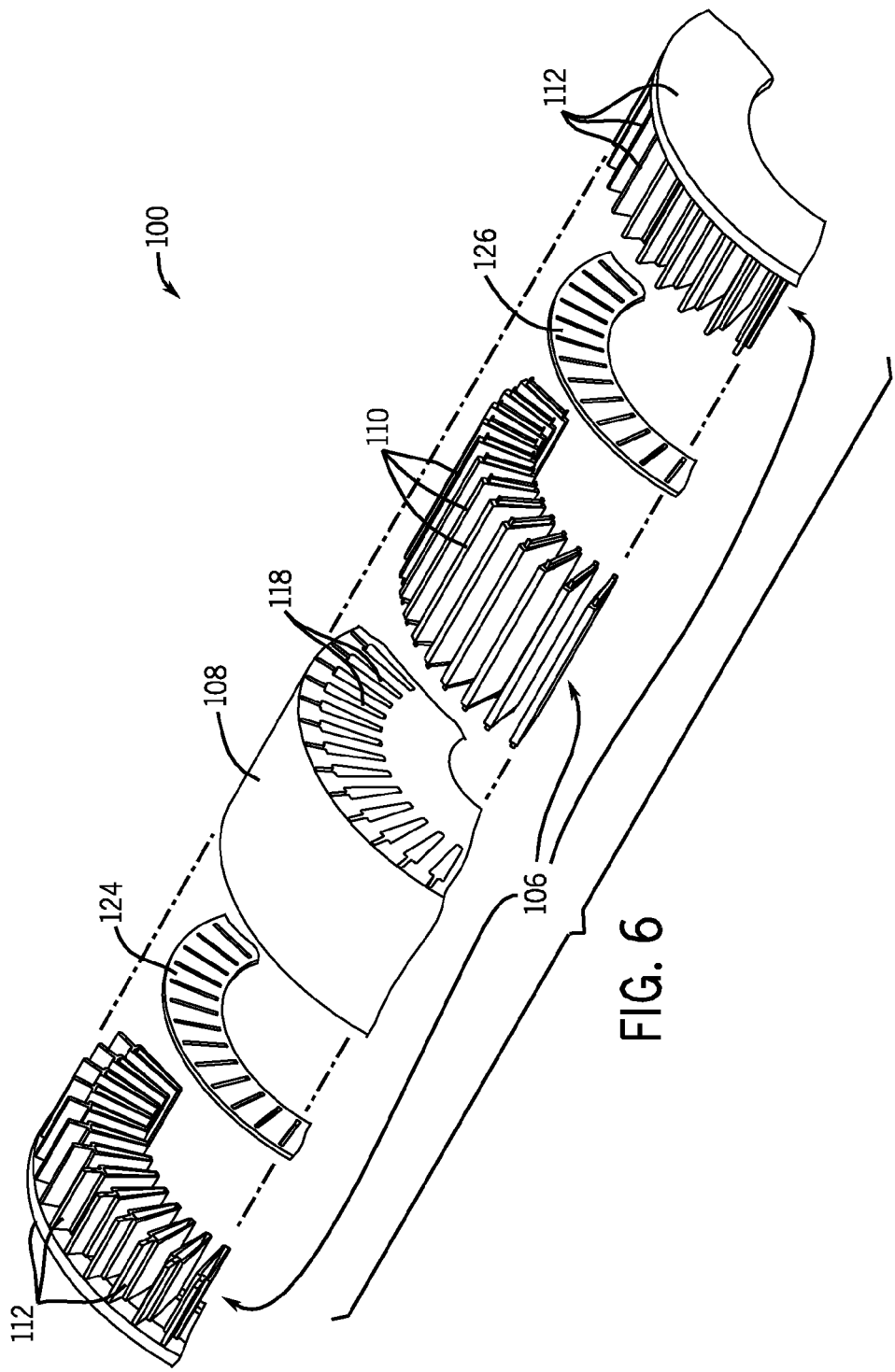
FIG. 6 is an exploded view of the electric machine of FIG. 1 according to an embodiment of the invention.

Referring now to FIG. 6, an exploded view of a portion of electric machine 100 of FIG. 1 is shown according to an embodiment of the invention. It is noted that fins 104 of FIG. 1 are not shown. As shown in FIG. 6, electric machine 100 includes a first coupling component 124 (i.e., a first ring), rotor core 108 having openings 118 therein, and a second coupling component 126 (i.e., a second ring). The plurality of rotor bars 106 are also shown in an exploded view, where each rotor bar 106 includes a first metallic material 110 and a second metallic material 112. It is noted that second metallic material 112 is shown as two components (i.e., one component next to first ring 124 and another component next to second ring 126) for illustrative purposes. According to embodiments where second metallic material 112 is cast about first metallic material 110, second metallic material 112 is one component.

Though not shown, it is contemplated that first metallic material 110 may have an intervening material (e.g., intervening material 120 of FIGS. 4-5) coupled thereto. If the intervening material is an insulator, first and second coupling components 124, 126 would also be substantially encased in the insulating material such that first metallic material 110 and first and second coupling components 124, 126 are electrically coupled together but substantially electrically isolated from second metallic material 112.

As explained above with respect to FIGS. 2-5, according to embodiments of the invention, first metallic material 110 has a lower electrical resistance than second metallic material 112. First metallic material 110 may be a bar or bar-like material, which is placed in an opening 118. According to an embodiment, once each metallic material 110 is placed in each opening 118, first and second coupling components 124, 126 are coupled thereto. Though first and second coupling components 124, 126 are shown as being circular or ring-shaped in the embodiment depicted in FIG. 6, other shapes are contemplated.

Still referring to FIG. 6, second metallic material 112 may be cast around first metallic material 110 into opening 118. As such, the manufacturing costs associated with casting first metallic material 110 may be avoided since first metallic material 110 need not be cast. According to the embodiments depicted in FIGS. 1 and 6, second metallic material 112 is also cast about first and second coupling components 124, 126.

Figure 7:
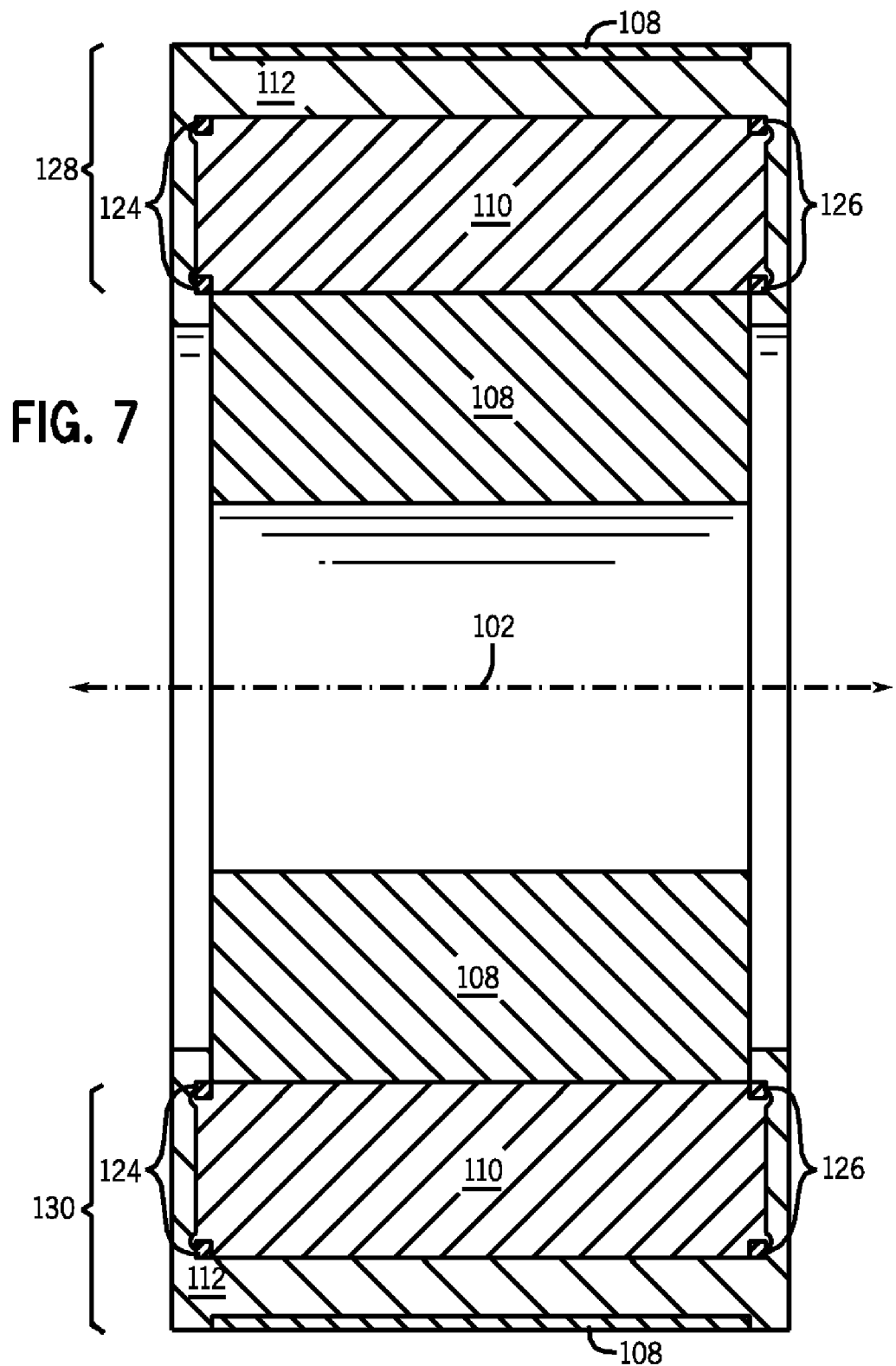
FIG. 7 is another cross-sectional view of the electric machine of FIG. 1 according to an embodiment of the invention.

Referring now to FIG. 7, a cross-sectional view of electric machine 100 along line 7-7 of FIG. 1 is shown according to an embodiment of the invention. A first rotor bar 128 and a second rotor bar 130 are shown in FIG. 7, where each rotor bar 128, 130 includes first metallic material 110 and a second metallic material 112. Also shown in FIG. 7 are first ring 124 (i.e., a first coupling component) and second ring 126 (i.e., a second coupling component), where each ring 124, 126 electrically couples first and second rotor bars 128, 130 to the other rotors bars (not shown) positioned about the circumference of electric machine 100. It is contemplated that first and second rings 124, 126 may be brazed to first material 110 to enable or enhance the electric coupling therebetween.

It is noted that the embodiment of electric machine 100 shown in FIG. 7 does not include cooling fins (e.g., cooling fins 104 of FIG. 1). However, as suggested in the description of FIG. 1, embodiments of an electric machine, such as electric machine 100, having cooling fins are contemplated.

Figure 8:
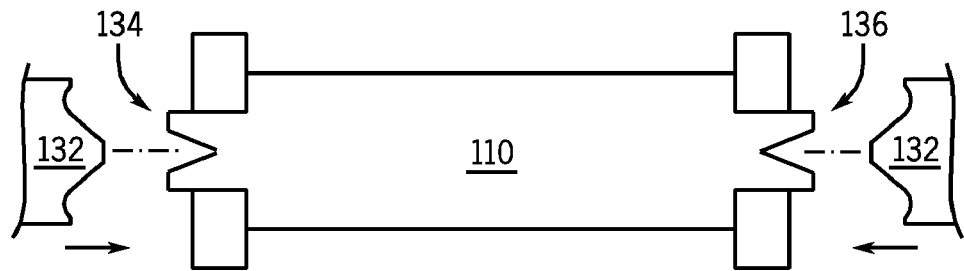
FIGS. 8-10 illustrate securing a first metallic material of a rotor bar to a first ring and a second ring prior to the casting of a second metallic material of the rotor bar thereabout according to an embodiment of the invention.
Figure 9:
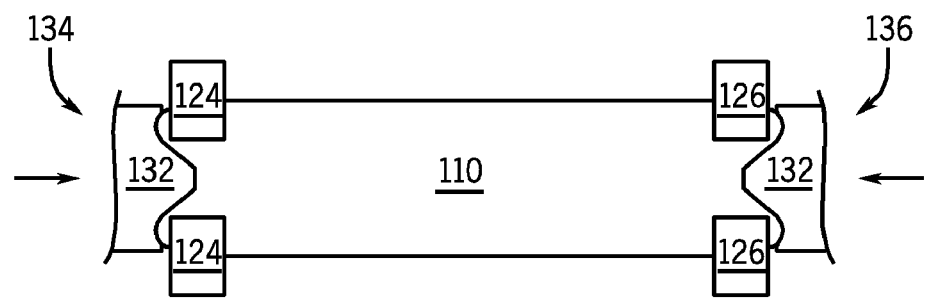
Figure 10:
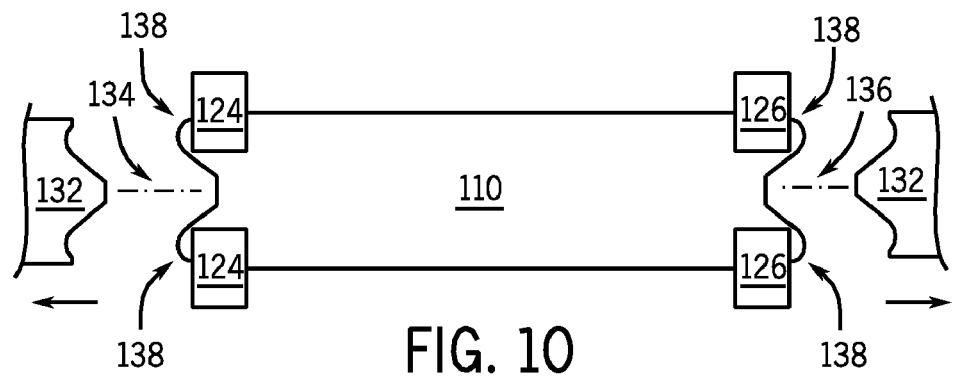

FIGS. 8-10 show steps for securing first metallic material 110 to first ring 124 and second ring 126 prior to the casting of second metallic material 112 thereabout according to an embodiment of the invention.

In FIG. 8, a compression tool 132 is aligned with a first end 134 and a second end 136 of first metallic material 110. In FIG. 9, compression tool 132 applies pressure to first and second ends 134, 136, thus deforming first and second ends 134, 136 such that they overlap a portion of a first ring 124 and a portion of a second ring 126, respectively. As shown in FIG. 10, compression tool 132 is removed from deformed first and second ends 134, 136, thus leaving a low resistance contact 138 formed between first metallic material 110 and first and second rings 124, 126. The low resistance contacts 138 thus formed ensure that first and second rings 124, 126 electrically couple all rotor bars 106 together as described above.

Figure 11:
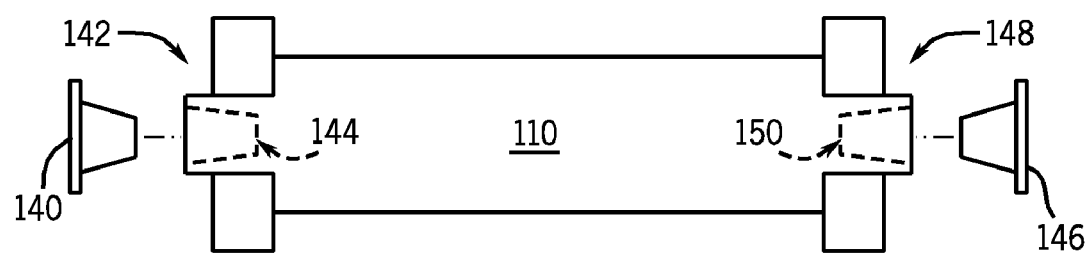
FIGS. 11-12 illustrate securing a first metallic material of a rotor bar to a first ring and a second ring prior to the casting of a second metallic material of the rotor bar thereabout according to another embodiment of the invention.
Figure 12:
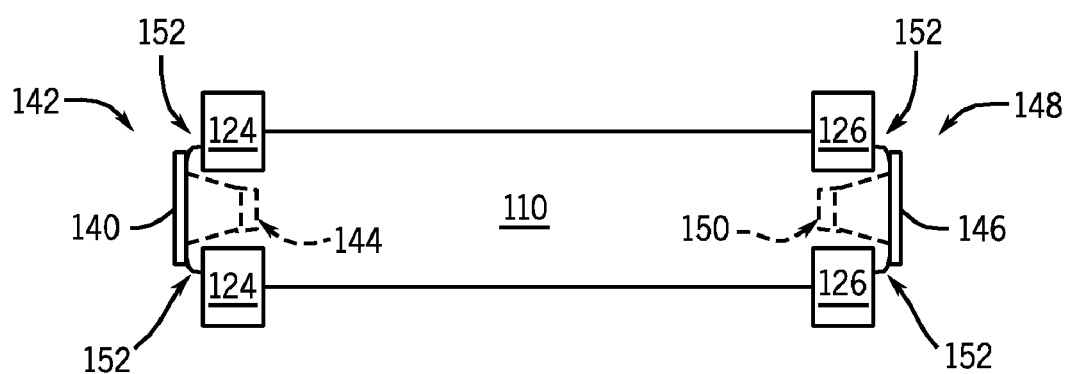

FIGS. 11-12 show steps for securing first metallic material 110 to first ring 124 and second ring 126 prior to the casting of second metallic material 112 thereabout according to another embodiment of the invention.

In FIG. 11, a first screw cap 140 is aligned with a first end 142 of a first metallic material 110, which has a first cavity 144 formed therein, and a second screw cap 146 is aligned with a second end 148 of first metallic material 110, which has a second cavity 150 formed therein. In FIG. 12, first and second screw caps 140, 146 are screwed into first and second cavities 144, 150 of first metallic material 110, thus causing first metallic material 110 to overlap first ring 124 and second ring 126. As such, a low resistance contact 152 is formed between first metallic material 110 and first and second rings 124, 126. In this manner, the low resistance contacts 152 thus formed ensure that first and second rings 124, 126 electrically couple all rotor bars 106 together as described above.

According to one embodiment, second metallic material 112 is cast around first metallic material 110 and first and second rings 124, 126 with first and second screw caps 140, 146 left inserted into first metallic material 110. In this manner, second metallic material 112 is cast around first and second screw caps 140, 146. According to another embodiment, first and second screw caps 140, 146 may be removed prior to casting.

Figure 13:
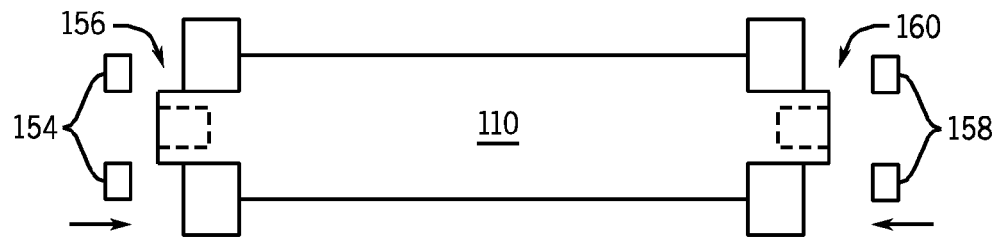
FIGS. 13-15 illustrate securing a first metallic material of a rotor bar to a first ring and a second ring prior to the casting of a second metallic material of the rotor bar thereabout according to another embodiment of the invention.
Figure 14:
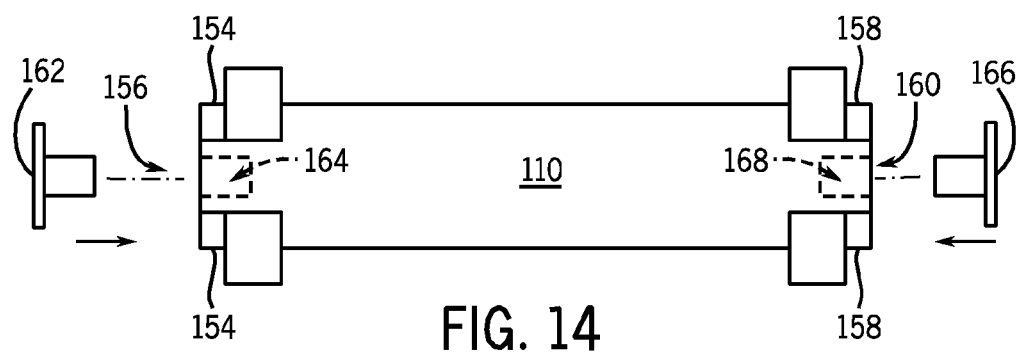
Figure 15:
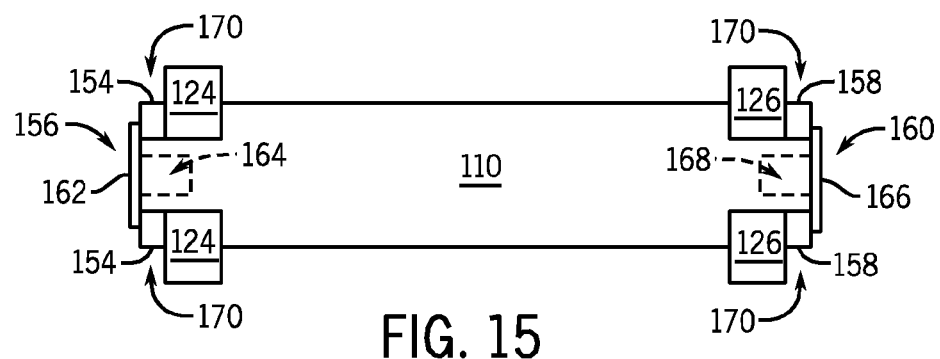

FIGS. 13-15 show steps for securing first metallic material 110 to first ring 124 and second ring 126 prior to the casting of second metallic material 112 thereabout according to another embodiment of the invention.

In FIG. 13, a first washer 154 is aligned with a first end 156 of first metallic material 110, and a second washer 158 is aligned with a second end 160 of first metallic material 110 opposite first end 156. In FIG. 14, first washer 154 is positioned about first end 156, and second washer 158 is positioned about second end 160. In addition, a first screw cap 162 is aligned with first end 156 of first material 110, which has a first cavity 164 formed therein, and a second screw cap 166 is aligned with second end 160 of first material 110, which has a second cavity 168 formed therein. As shown in FIG. 15, first screw cap 162 is coupled to first end 156 and second screw cap 166 is coupled to second end 160. As such, first metallic material 110 makes a low resistance contact 170 with first ring 124 via first screw cap 162 and first washer 154 and with second ring 126 via second screw cap 166 and second washer 158.

Therefore, according to one embodiment of the invention, an electric machine includes a plurality of rotor bars and a first coupling component configured to electrically couple the plurality of rotor bars together. Each rotor bar of the plurality of rotor bars includes a first metallic material having a first electrical resistivity and a second metallic material cast about the first material, where the second metallic material has a second electrical resistivity greater than the first electrical resistivity. The first metallic material has a first end and a second end opposite the first end and the first coupling component is coupled to the first end of the first metallic material.

According to another embodiment of the invention, a method of manufacturing an electric machine includes inserting a plurality of bars into a rotor bar housing and electrically coupling the plurality of bars together, where each bar of the plurality of bars includes a first metallic material having a first electrical resistivity. The method also includes casting a second metallic material about the plurality of bars inserted into the rotor bar housing, where the second metallic material has a second electrical resistivity greater than the first electrical resistivity.

According to another embodiment of the invention, an electric machine includes a plurality of rotor bars and a first electrical coupling ring configured to electrically couple each rotor bar of the plurality of rotor bars together. Each rotor bar of the plurality of rotor bars includes a metallic bar and a metallic covering surrounding at least a majority of the metallic bar. Each metallic bar includes a first material having a first electrical resistivity and each metallic covering has a second electrical resistivity greater than the first electrical resistivity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric machine comprising:
  a plurality of rotor bars;
  a first coupling component configured to electrically couple the plurality of rotor bars together, wherein each rotor bar of the plurality of rotor bars comprises:
    a first metallic material having a first electrical resistivity, the first metallic material having a first end and a second end opposite the first end, wherein the first coupling component is coupled to the first end of the first metallic material; and
    a second metallic material cast about the first material and about portions of the first coupling component and having a second electrical resistivity greater than the first electrical resistivity;
  wherein the first metallic material comprises a copper bar and the second metallic material comprises aluminum;
  wherein each rotor bar of the plurality of rotor bars has a first end and a second end opposite the first end, and wherein the first coupling component is electrically coupled to the first end of each rotor bar of the plurality of rotor bars;
  wherein the electric machine further comprises a second coupling component coupled to the second end of each rotor bar of the plurality of rotor bars, wherein the second coupling component is configured to electrically couple the plurality of rotor bars together; and
  wherein the second metallic material is also cast about portions of the second coupling component.

2. The electric machine of claim 1 further comprising:
  a first cap screwed to a first end of the first metallic material; and
  a second cap screwed to a second end of the first metallic material opposite the first end of the first metallic material.

3. The electric machine of claim 1 wherein each rotor bar of the plurality of rotor bars further comprises an intervening material between the first and second metallic materials, wherein the intervening material is configured to aid in an adhesion of the second metallic material to the first metallic material.

4. The electric machine of claim 3 wherein the intervening material comprises an aluminum cladding over the first metallic material.

5. The electric machine of claim 1 further comprising an intervening material coupled to the first material of each rotor and to the first and second coupling components, and wherein the intervening material is configured to at least partially electrically isolate the first metallic material of each rotor bar and the first and second coupling components from the second material of each rotor bar.

6. A method of manufacturing an electric machine comprising:
  inserting a plurality of bars into a rotor bar housing, wherein each bar of the plurality of bars comprises a first metallic material having a first electrical resistivity;
  coupling a first coupling component to the plurality of bars to electrically couple the plurality of bars together; and
  casting a second metallic material about the plurality of bars inserted into the rotor bar housing and about portions of the first coupling component, wherein the second metallic material has a second electrical resistivity greater than the first electrical resistivity;
  wherein electrically coupling the plurality of bars together comprises:
    coupling a first coupling component to a first end of each bar of the plurality of bars; and
    coupling a second coupling component to a second end of each bar of the plurality of bars opposite the first end; and
  wherein coupling the first coupling component to a first end of each bar of the plurality of bars comprises:
    compressing the first end of each bar of the plurality of bars such that a first portion of each bar of the plurality of bars deforms to overlap a portion of the first coupling component; and
    compressing the second end of each bar of the plurality of bars such that a second portion of each bar of the plurality of bars deforms to overlap a portion of the second coupling component.

7. The method of claim 6 further comprising coupling an electrical insulator to each bar of the plurality of bars.

8. The method of claim 6 further comprising cladding each bar of the plurality of bars with a metallic cladding material.

9. The method of claim 8 wherein the cladding material comprises aluminum.

10. The method of claim 6 wherein coupling a first coupling component to a first end of each bar of the plurality of bars comprises brazing the first coupling component to the first end of each bar of the plurality of bars, and wherein coupling a second coupling component to a second end of each bar of the plurality of bars opposite the first end comprises brazing the second coupling component to the second end of each bar of the plurality of bars.

11. An electric machine comprising:
 a plurality of rotor bars;
 a first electrical coupling ring configured to electrically couple each rotor bar of the plurality of rotor bars together, wherein each rotor bar of the plurality of rotor bars comprises:
  a metallic bar comprising a first material having a first electrical resistivity; and
  a metallic covering surrounding at least a majority of the metallic bar, the metallic covering casted to the metallic bar and having a second electrical resistivity greater than the first electrical resistivity;
 a second electrical coupling ring configured to electrically couple each rotor bar of the plurality of rotor bars together; and
 an insulating material coupled to the first and second coupling rings and to the metallic bar of each rotor bar, wherein the insulating material is configured to at least partially isolate the first and second coupling rings and the metallic bar of each rotor bar form the metallic covering of each rotor bar.

12. The electric machine of claim 11 wherein each rotor bar of the plurality of rotor bars further comprises a cladding configured to enhance bonding between the metallic covering and the metallic bar component.

13. The electric machine of claim 12 wherein the cladding comprises aluminum and the metallic bar comprises at least one of copper, nickel, and silver.

14. The electric machine of claim 11 wherein the metallic covering comprises aluminum.

15. An electric machine comprising:
 a plurality of rotor bars;
 a first electrical coupling ring configured to electrically couple each rotor bar of the plurality of rotor bars together, wherein each rotor bar of the plurality of rotor bars comprises:
  a metallic bar comprising a first material having a first electrical resistivity and comprising a first end and a second end opposite the first end;
  a metallic covering surrounding at least a majority of the metallic bar, the metallic covering having a second electrical resistivity greater than the first electrical resistivity;
  a first screw cap coupled to the first end of the metallic bar; and
  a washer component about the first end of the metallic bar and positioned adjacent to a portion of the first screw cap and the first electrical coupling ring, wherein the metallic bar is electrically coupled to the first electrical coupling ring via the portion of the first screw cap and the washer component.

16. A method of manufacturing an electric machine comprising:
 inserting a plurality of bars into a rotor bar housing, wherein each bar of the plurality of bars comprises a first metallic material having a first electrical resistivity;
 electrically coupling the plurality of bars together;
 casting a second metallic material about the plurality of bars inserted into the rotor bar housing, wherein the second metallic material has a second electrical resistivity greater than the first electrical resistivity;
 wherein electrically coupling the plurality of bars together comprises:
  coupling a first coupling component to a first end of each bar of the plurality of bars; and
  coupling a second coupling component to a second end of each bar of the plurality of bars opposite the first end; and
 wherein coupling the first coupling component to a first end of each bar of the plurality of bars comprises:
  compressing the first end of each bar of the plurality of bars such that a first portion of each bar of the plurality of bars deforms to overlap a portion of the first coupling component; and
  compressing the second end of each bar of the plurality of bars such that a second portion of each bar of the plurality of bars deforms to overlap a portion of the second coupling component.

* * * * *